(12) United States Patent
Waite

(10) Patent No.: US 10,811,151 B2
(45) Date of Patent: Oct. 20, 2020

(54) APPARATUS AND METHOD FOR IDENTIFYING CRACKS IN A STRUCTURE USING A MULTI-STAGE CLASSIFIER

(71) Applicant: Electric Power Research Institute, Inc., Charlotte, NC (US)

(72) Inventor: Thomas Waite, El Sobrante, CA (US)

(73) Assignee: ELECTRIC POWER RESEARCH INSTITUTE, INC., Charlotte, NC (US)

( * ) Notice: Subject to any disclaimer, the term of this patent is extended or adjusted under 35 U.S.C. 154(b) by 109 days.

(21) Appl. No.: 16/021,759

(22) Filed: Jun. 28, 2018

(65) Prior Publication Data

US 2019/0019589 A1  Jan. 17, 2019

Related U.S. Application Data

(60) Provisional application No. 62/528,708, filed on Jul. 5, 2017.

(51) Int. Cl.
| | |
|---|---|
| *G06K 9/00* | (2006.01) |
| *G21C 17/017* | (2006.01) |
| *G21C 17/013* | (2006.01) |
| *G06T 7/44* | (2017.01) |
| *G06T 7/00* | (2017.01) |
| *G06T 7/37* | (2017.01) |

(Continued)

(52) U.S. Cl.
CPC ............ *G21C 17/017* (2013.01); *G06T 5/002* (2013.01); *G06T 5/20* (2013.01); *G06T 7/0004* (2013.01); *G06T 7/0008* (2013.01); *G06T 7/37* (2017.01); *G06T 7/44* (2017.01); *G21C 17/013* (2013.01); *G06T 2207/10008* (2013.01); *G06T 2207/10016* (2013.01); *G06T 2207/10116* (2013.01); *G06T 2207/20004* (2013.01); *G06T 2207/20024* (2013.01); *G06T 2207/20028* (2013.01); *G06T 2207/20032* (2013.01); *G06T 2207/20076* (2013.01); *G06T 2207/20081* (2013.01); *G06T 2207/20182* (2013.01); *G06T 2207/30136* (2013.01); *G06T 2207/30164* (2013.01)

(58) Field of Classification Search
None
See application file for complete search history.

(56) References Cited

U.S. PATENT DOCUMENTS

| | | | | |
|---|---|---|---|---|
| 4,169,758 A | * | 10/1979 | Blackstone | ............ G21C 17/01 |
| | | | | 348/83 |
| 6,028,948 A | * | 2/2000 | Kil | ............ E01C 23/01 |
| | | | | 382/108 |

(Continued)

OTHER PUBLICATIONS

Lyer et al ("Segmentation of Pipe Images for Crack Detection in Buried Sewers", Computer-Aided civil and infrastructure Engineering 21, 295-410, 2006) (Year: 2006).*

*Primary Examiner* — Shervin K Nakhjavan
(74) *Attorney, Agent, or Firm* — Trego, Hines & Ladenheim, PLLC; Brandon Trego; Jonathan Hines

(57) ABSTRACT

A method of inspecting a structure for cracks is disclosed. The method includes the steps of moving an inspection vehicle along a pre-determined path through an area to be inspected, the inspection vehicle having a camera apparatus configured to scan the area to be inspected; using the camera apparatus to scan the area to be inspected at a pre-determined distance per second, thereby capturing scan data for analysis; and analyzing the scan data to classify cracks in the structure.

16 Claims, 18 Drawing Sheets

(51) Int. Cl.
    *G06T 5/20*    (2006.01)
    *G06T 5/00*    (2006.01)

(56)                References Cited

U.S. PATENT DOCUMENTS

| | | | |
|---|---|---|---|
| 8,086,425 B2* | 12/2011 | Papadimitriou | G10L 17/00 |
| | | | 324/228 |
| 8,818,746 B1* | 8/2014 | Johnson | G01N 29/045 |
| | | | 702/190 |
| 2002/0090048 A1* | 7/2002 | Mizumachi | G21C 17/017 |
| | | | 376/245 |
| 2004/0246473 A1* | 12/2004 | Hermary | G01B 11/245 |
| | | | 356/237.1 |
| 2006/0276985 A1* | 12/2006 | Xu | G01C 11/025 |
| | | | 702/81 |
| 2007/0140403 A1* | 6/2007 | Yuguchi | G21C 17/01 |
| | | | 376/249 |
| 2007/0157730 A1* | 7/2007 | Ochiai | F22B 37/003 |
| | | | 73/627 |
| 2017/0277187 A1* | 9/2017 | Refai | G06T 7/30 |
| 2017/0343481 A1* | 11/2017 | Jahanshahi | G06N 3/0454 |
| 2017/0372704 A1* | 12/2017 | Papadimitriou | G01M 5/0033 |
| 2018/0100816 A1* | 4/2018 | Featonby | G01N 23/18 |
| 2020/0175352 A1* | 6/2020 | Cha | G06N 3/08 |

* cited by examiner

CRACK AND WELD IMAGE
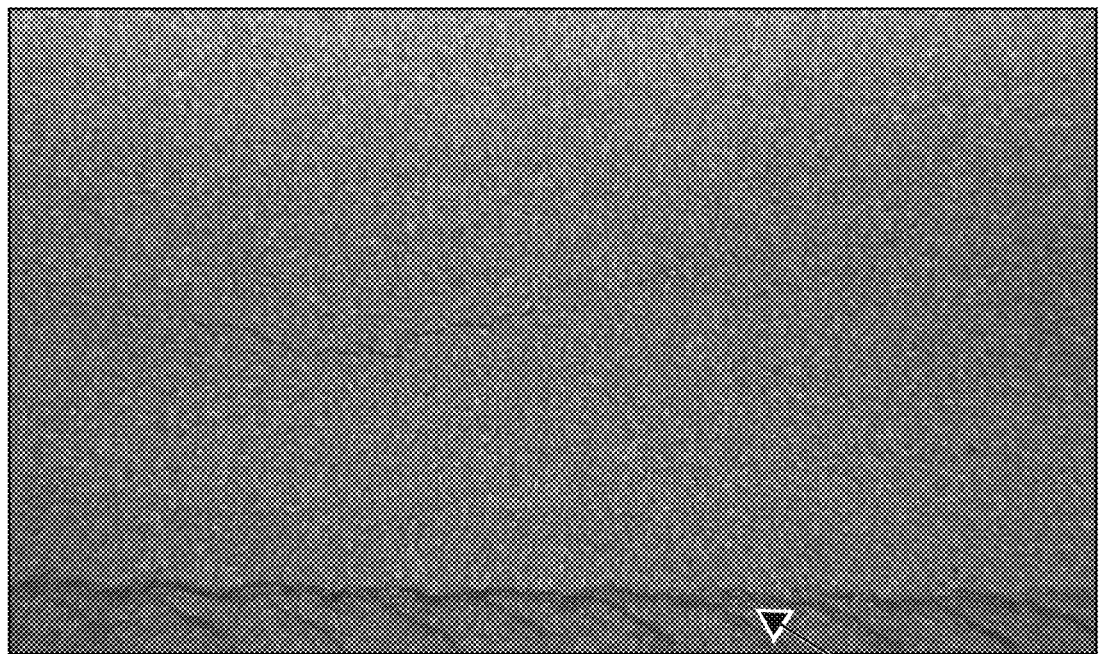
FIG. 16      WELD BOUNDARY
CRACK AND WELD IMAGE WITH CLASSIFIER OVERLAY
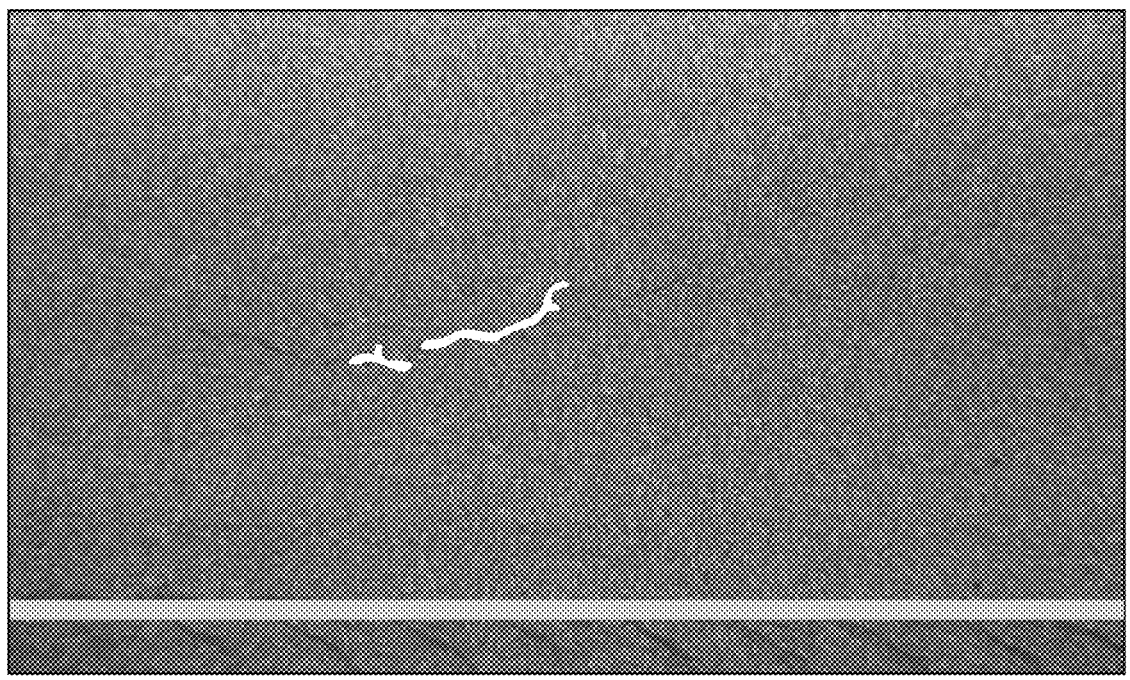
FIG. 17

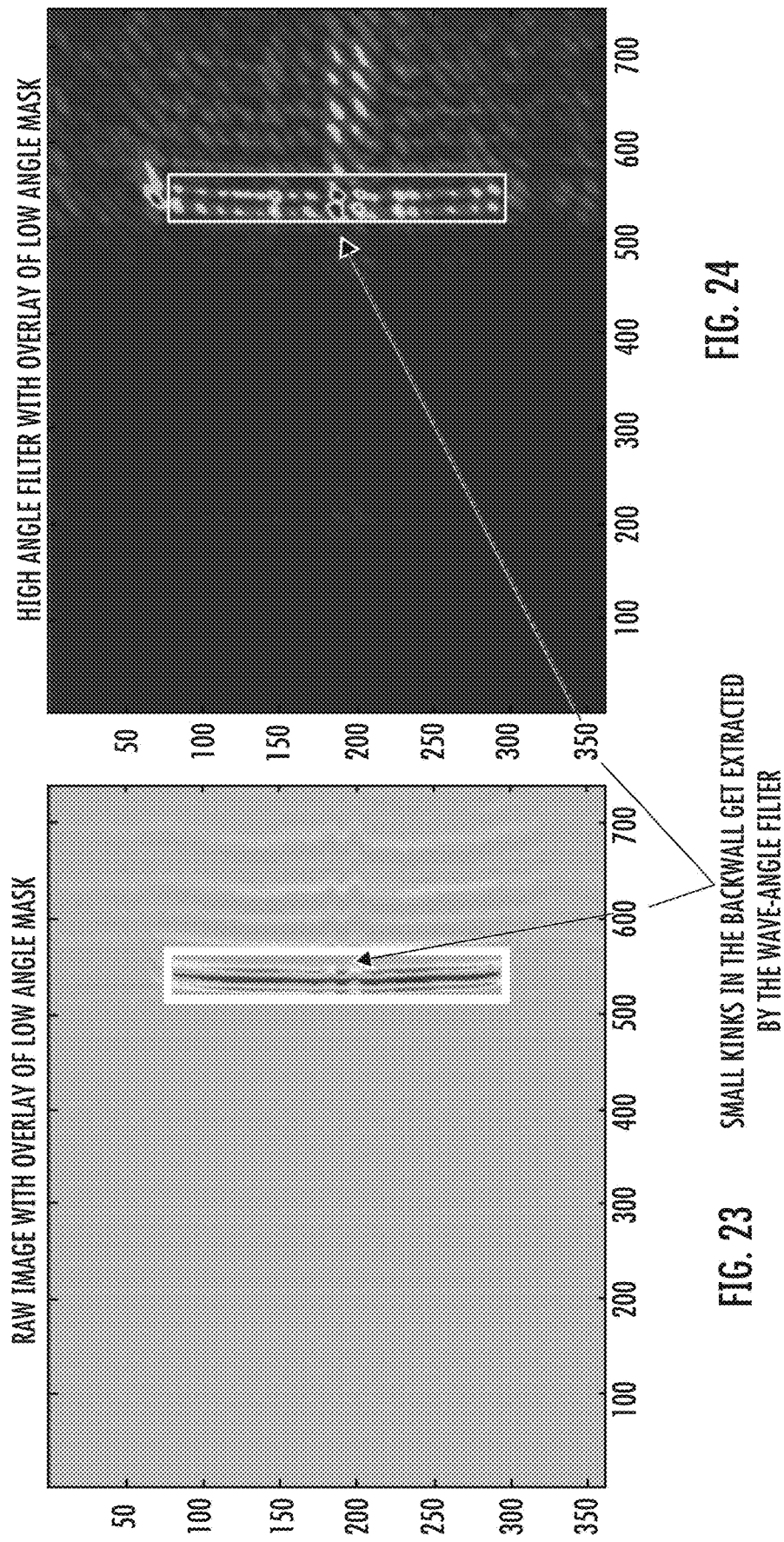

APPARATUS AND METHOD FOR IDENTIFYING CRACKS IN A STRUCTURE USING A MULTI-STAGE CLASSIFIER

BACKGROUND OF THE INVENTION

This invention relates generally to an apparatus and method for identifying cracks in a structure, and more particularly to a multi-stage classifier for identifying cracks in a structure.

Cracks in a structure, if left in an unrepaired state, can be very problematic. As cracks migrate, the structure is weakened and may result in failure of the structure. This is especially important in structures such as a nuclear reactor where structure failure could result in a catastrophic event.

Unfortunately, traditional inspection methods are not always possible due to location, environment, and other impediments. For example, in a nuclear reactor, radiation is dangerous to inspectors making it difficult to provide proper inspections of the reactor without major shutdowns of the reactor and the use of expensive equipment.

Accordingly, there is a need for an inspection apparatus and method that allows proper inspections to be made to structures that are difficult to inspect do to location, environmental conditions, and other impediments.

BRIEF SUMMARY OF THE INVENTION

This need is addressed by an apparatus and method that allows for cracks to be identified in a structure without direct human interaction at the location of the crack, thereby reducing the need for a major shutdown and exposure to harmful environment conditions.

According to an aspect of the technology described herein, a method of inspecting a structure for cracks includes the steps of moving an inspection vehicle along a pre-determined path through an area to be inspected, the inspection vehicle having a camera apparatus configured to scan the area to be inspected; using the camera apparatus to scan the area to be inspected at a pre-determined distance per second, thereby capturing scan data for analysis; and analyzing the scan data to classify cracks in the structure.

According to another aspect of the technology described herein, a method of inspecting a nuclear reactor vessel includes the steps of providing a rail system disposed in the nuclear reactor vessel, the rail system being designed to provide a pre-determined inspection path through the nuclear reactor vessel; providing an inspection vehicle configured to traverse the rail system, the inspection vehicle having a camera apparatus configured to scan the nuclear reactor vessel along the inspection path; using the camera apparatus to scan along the inspection path at a pre-determined distance per second, thereby capturing image data of the nuclear reactor vessel; and analyzing the image data to classify cracks in the nuclear reactor vessel.

BRIEF DESCRIPTION OF THE DRAWINGS

The invention may be best understood by reference to the following description taken in conjunction with the accompanying drawing figures, in which:

FIG. 16 is a crack and weld image;

FIG. 17 shows the crack and weld image of FIG. 16 with a classifier overlay;

FIG. 23 shows the back wall interference of FIG. 21;

FIG. 24 shows the image of FIG. 23 with the backwall interference removed;

DETAILED DESCRIPTION OF THE INVENTION

Figure 1:
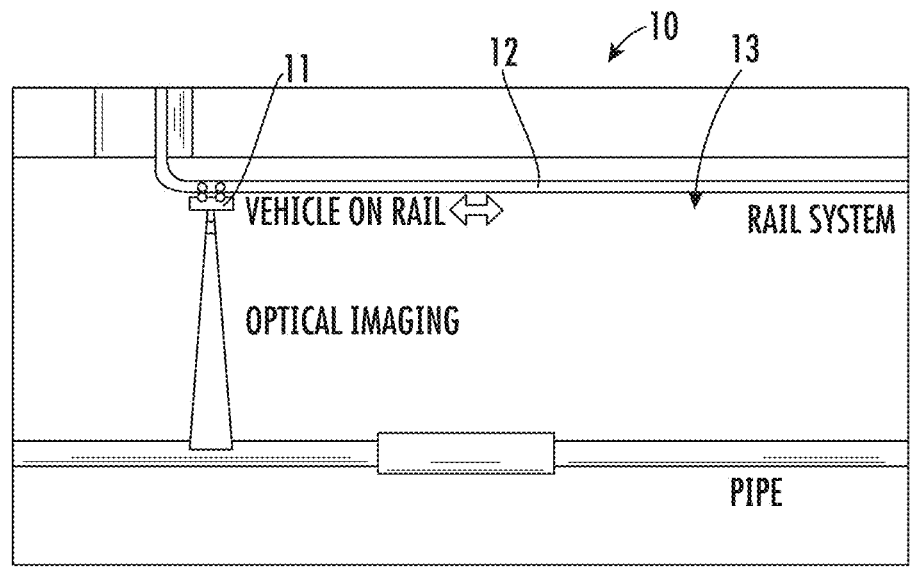
FIG. 1 shows an apparatus according to an embodiment of the invention scanning a structure.

Referring to the drawings wherein identical reference numerals denote the same elements throughout the various views, FIG. 1 illustrates an apparatus, such as vehicle 11, scanning internal structures, such as pipe 13, of a nuclear reactor vessel 10 for cracks formed therein. As shown, the vehicle 11 runs along a rail system 12 designed to allow the vehicle 11 to traverse the vessel 10 along a pre-determined path and inspect the vessel 10 and internal structures contained therein. The rail system 12 may be designed to maximize scanning capability of the vehicle 11 for each individual vessel being inspected. In other words, the rail system 12 may be customized for each vessel 10 being inspected by adding multiple straight and curved sections to provide adequate scanning of the vessel 10. A drive system is provided to move the vehicle 11 along the rail system 12.

As shown, the vehicle 11 is autonomous; however, the vehicle 11 may also be controlled remotely by a user. The vehicle 11 uses a camera apparatus 14 to perform scans at a pre-determined rate, for example, 2.54 cm per second (1 in/sec) and operates, in the case of a nuclear reactor vessel, in the water of the vessel 10; thus, eliminating exposure to individuals. It should be appreciated that the current invention is also applicable to areas not associated with nuclear reactor vessels. For purposes of this application, the term "scan" refers to the act of taking photos, videos, and any other suitable imaging technology such as thermal imaging, etc.

Figure 2:
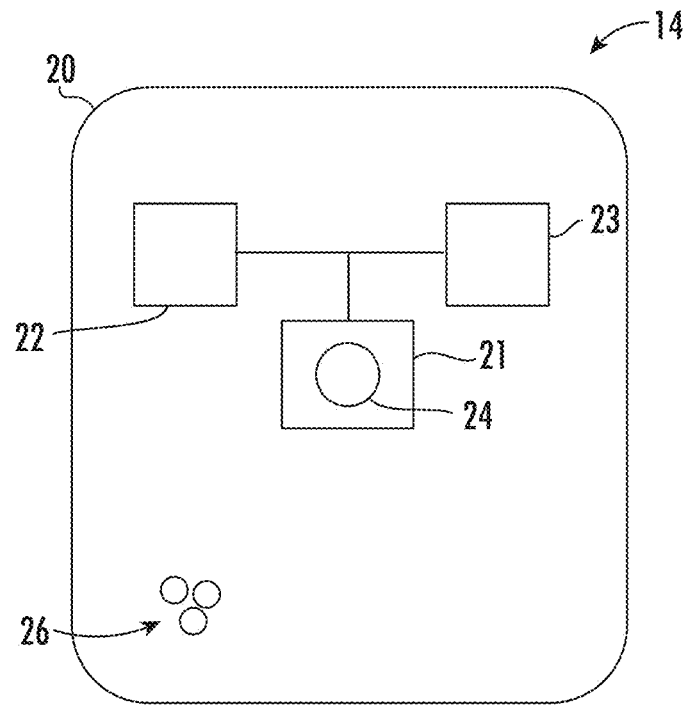
FIG. 2 shows components of the apparatus of FIG. 1.

Referring to FIG. 2, in general, the camera apparatus 14 includes an outer housing 20 configured to house the camera apparatus' electronics (including an image sensor 21 operable to generate scan and/or image data, a storage device 22 operable to store image data, and a controller 23) in an environment proof container. The image sensor 21 and storage device 22 are connected to the controller 23 to permit transmission of image data from the image sensor 21 to the storage device 22. A lens 24 is connected to the image sensor 21 and configured to focus on an image and allow the image sensor 21 to capture the image as a video and/or still image. Illumination devices such as infrared lights 26 may be provided to illuminate an area for the camera apparatus 14.

The controller 23 may be a separate hardware device or it may be incorporated into or combined with the hardware of the image sensor 21 and/or the storage device 22. The controller 23 may be implemented as one or more software programs running on one or more processors. For example, the controller 23 could be integral to the programming of the image sensor 21. The controller 23 is configured to transmit real-time data and receive and/or respond to commands from a user via wired, radio frequency (RF), short range ultra-high frequency (UHF) such as BLUETOOTH, a local area network such as Wi-Fi, or a wide-area network such as the Internet. In addition to transmitting image data to the storage device 22, the controller 23 may transmit real-time image data to a remote location and/or user, perform on-board processing of real-time image data, and/or in response to a command, perform a re-scan of an area of interest in the vessel 10.

The image data captured by the vehicle 11 is analyzed using an automated visual analysis algorithm to classify cracks and reduce false positives and/or human error. Once a crack is classified, it may be presented to a human analyst for final analysis. As stated above, the analysis may occur on board the vehicle or at a remote location.

In general, the algorithm is a deep architecture of filtering and adaptive machine learning components that integrates pre-defined filtering, shape, amplitude and pixel-level texture features, optimized feature mapping and multiple classifiers that provide probability of classes and vote on the output. The display of the image is a 2D mosaic that integrates the 2D frames using a rigid registration to provide the mosaic.

It should be understood that, in general, the filtering and feature extraction algorithms are generic to any 2D, 3D (both physical volume and 2D over time windows). Further non-destructive examination (NDE) is applied to the examination of physical structures using a wide range of imaging modalities including x-ray, video and ultrasonic. Video may be from a multitude of sources including underwater fixed and non-fixed cameras, UAV on aerial platforms, and includes both visible light bands and thermal (infra-red) bands.

The algorithm uses a multi-stage deep processing method to cascade low level filtering for signal separation and enhancement, midlevel segmentation of shape of filtered regions, feature generation in terms of pixel-level texture and segmented blob shape, first pass labeling of pixels to texture regions for inclusion in the grind-crack cluster, extraction of grind regions only based on cluster shape, final classification of crack vs. deep grind that is crack-like based on a combination of shape and Gabor features.

A Gabor engine provides a specialized variation of complex Gabor filters where the Gabor vector is broken into frequency-bandwidth sections and, normally, all Gabor angles are represented as independent scalar values. Processing is done to reduce the Gabor angles to two values: the maximum angle energy and the angle at which the maximum angle occurs. This removes angle dependence in the classifier and the trajectory of the angles in the segmented blob become a further descriptor of shape.

The advantage is that a fully automated analysis is provided. The filtering to remove background noise means the data is also easier to look at as the distraction noise is now gone. The new display for the video is a 2D Mosaic image that splices all the frames together so the analyst does not have to integrate frames in their minds which is prone to human error. Machine learning also adds a finer analysis of cracks and crack-like anomalies and helps discriminate them.

The algorithm processes the image data by: (1) Filtering to generate crack (grind) and scratch image frames; (2) Registration to generate a single mosaic image including current inter-frame registration translation and affine registration for scale and skew distortion; (3) Shape processing and segmentation including Pass1 shape filter to remove small high amplitude disc noise, low pass filtering to smooth fragmented cracks, and Pass2 shape filter to extract elongated targets that are crack like. Each of these will be discussed in more detail below.

Filtering and Registration

Figure 3:
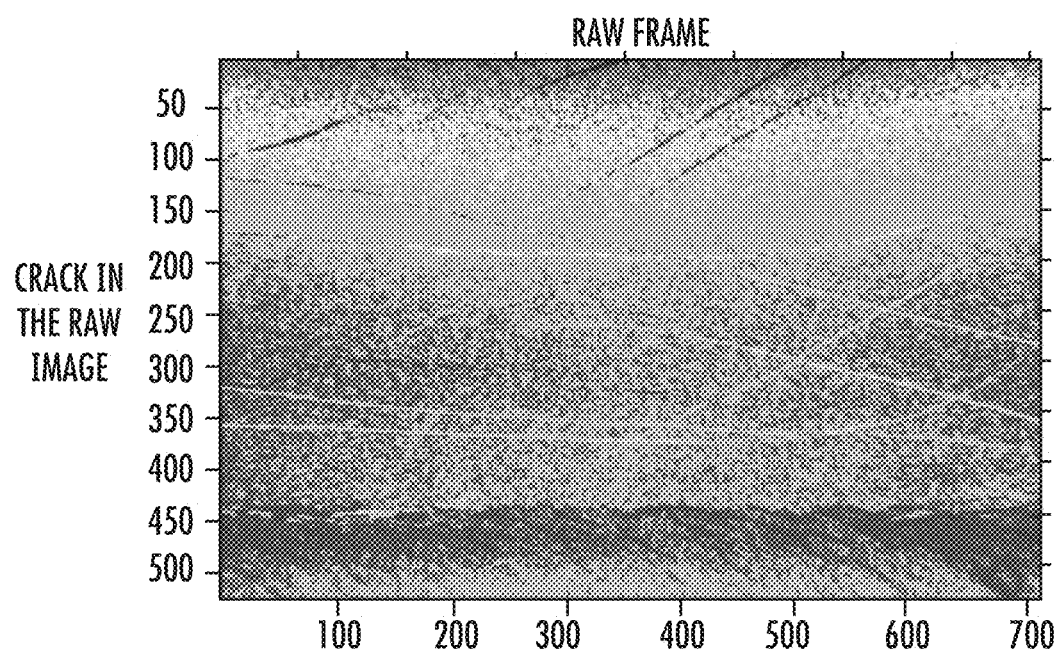
FIG. 3 is a raw image taken by the apparatus of FIG. 1.
Figure 4:
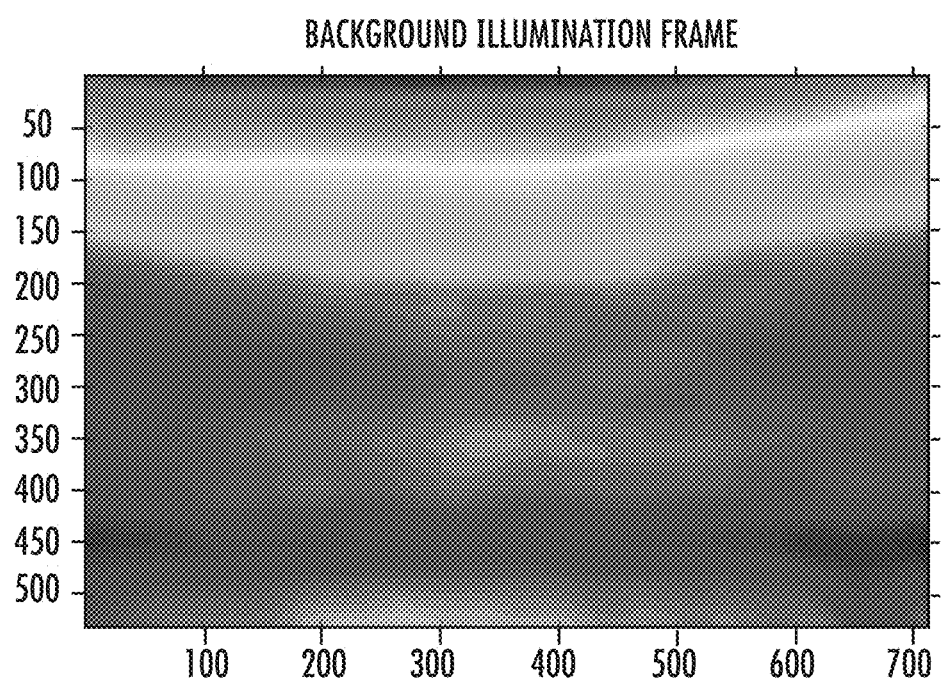
FIG. 4 shows a background illumination image of the raw image of FIG. 3.
Figure 5:
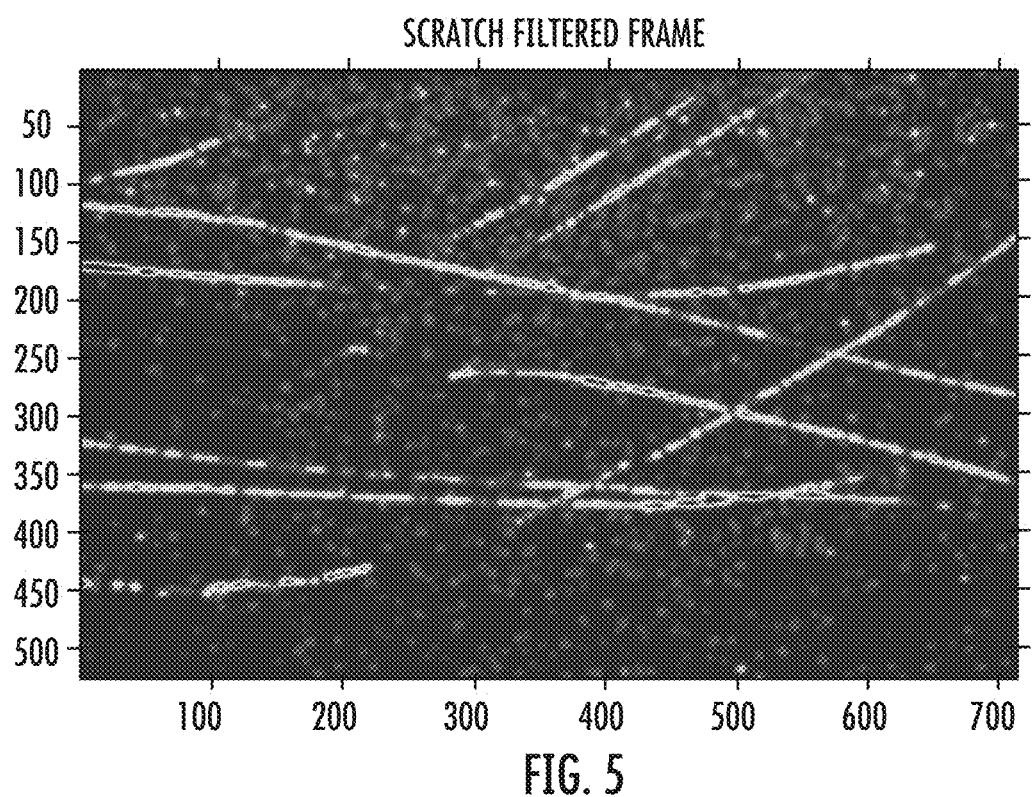
FIG. 5 shows a scratch filtered image of the raw image of FIG. 3.
Figure 6:
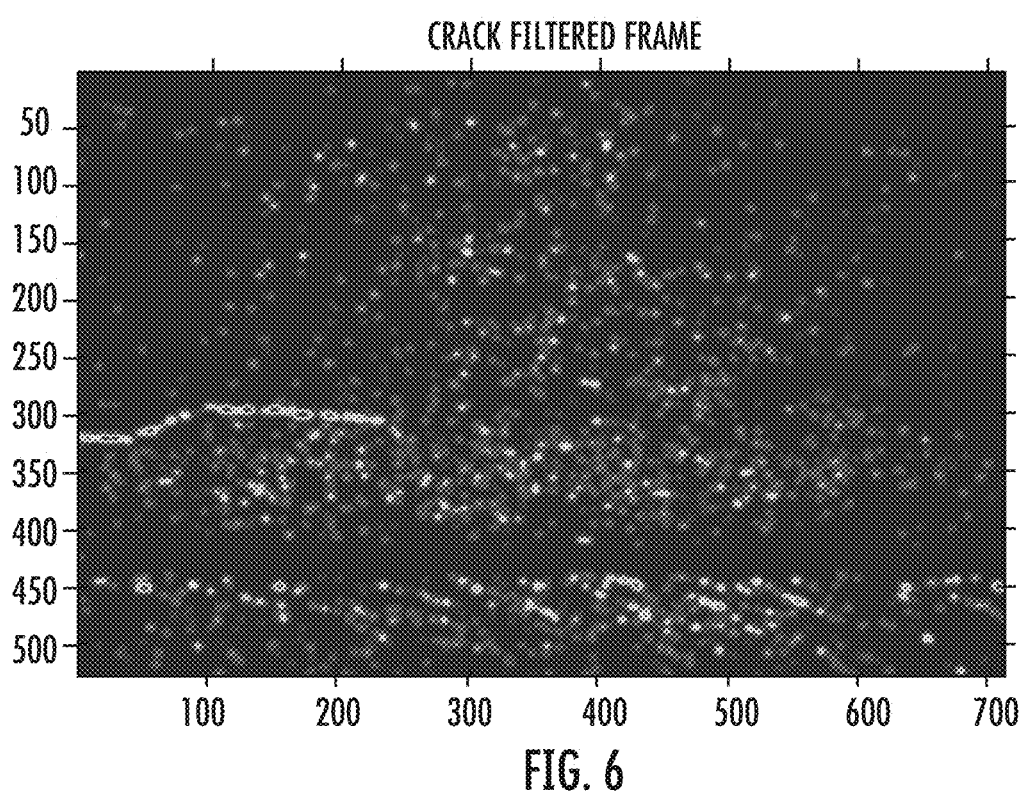
FIG. 6 shows a crack filtered image of the raw image of FIG. 3.

The filtering step applies a three-stage filter to a raw frame, FIG. 3, to (1) remove non-uniform illumination, FIG. 4, and (2) separate the image of FIG. 4 into high amplitude scratch, FIG. 5, and low amplitude crack+grind, FIG. 6, frames. A polarity filter is used to separate the image.

The non-uniform illumination is first calculated from an ensemble average of about 100 frames. After the average, the image is processed with sub-blocked average. This means the image is divided into overlapping 16×16 or 32×32 overlapping sub-blocks. Within each block, pixels are sorted and the highest and lowest pixels are removed with the remainder averaged. This is referred to as trim-mean. The trim-mean value is then the value of the block. The image is then low pass filtered and a proportion of the illumination is removed.

Figure 8:
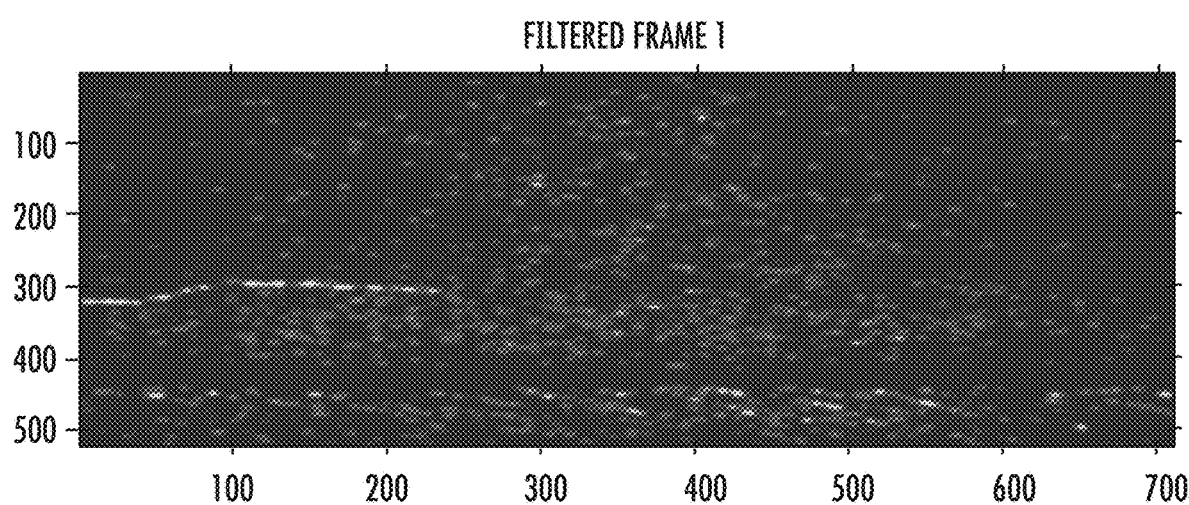
FIGS. 8-10 show filtered images from with the mosaic of FIG. 7 was created.
Figure 9:
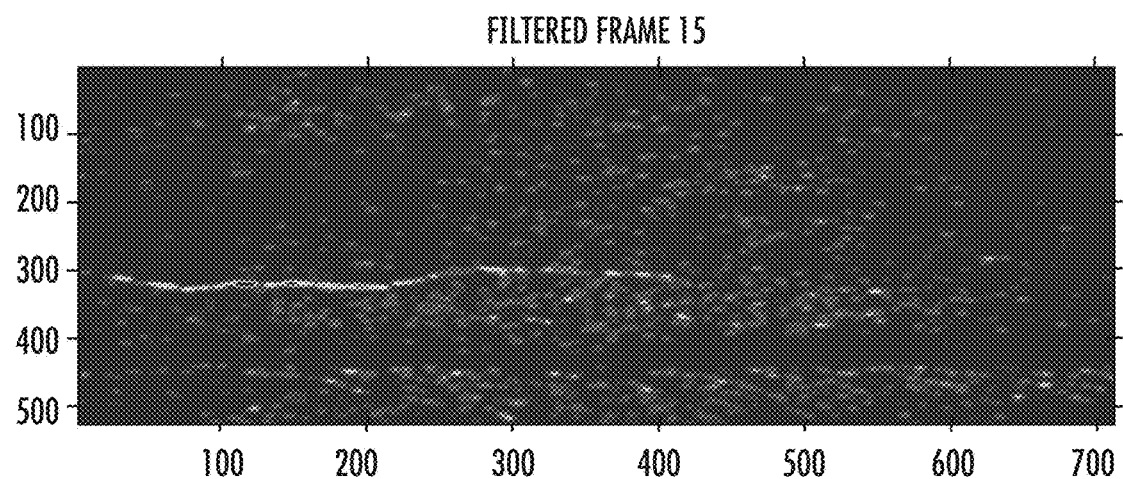
Figure 10:
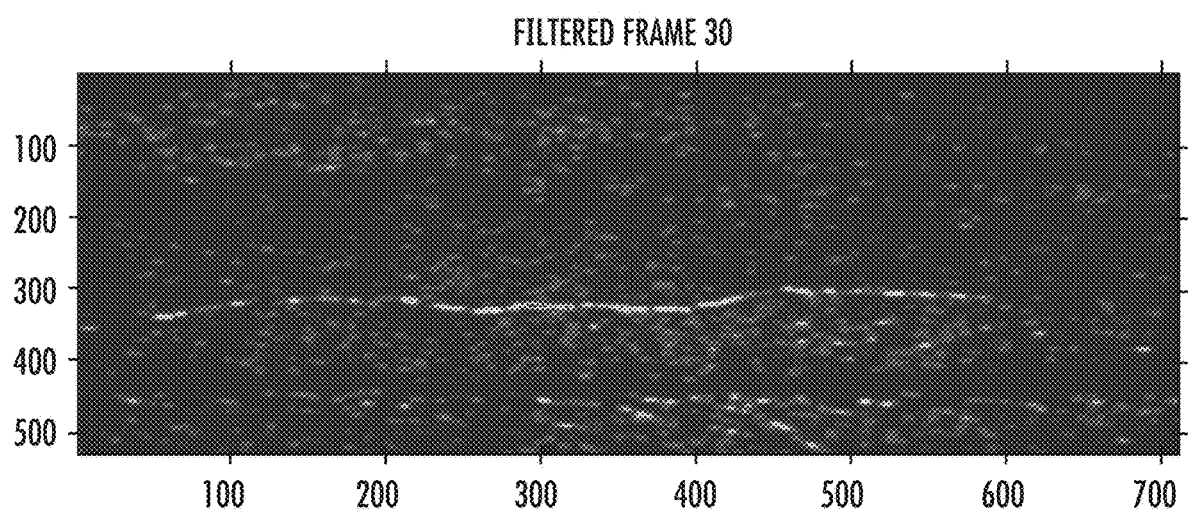
Figure 11:
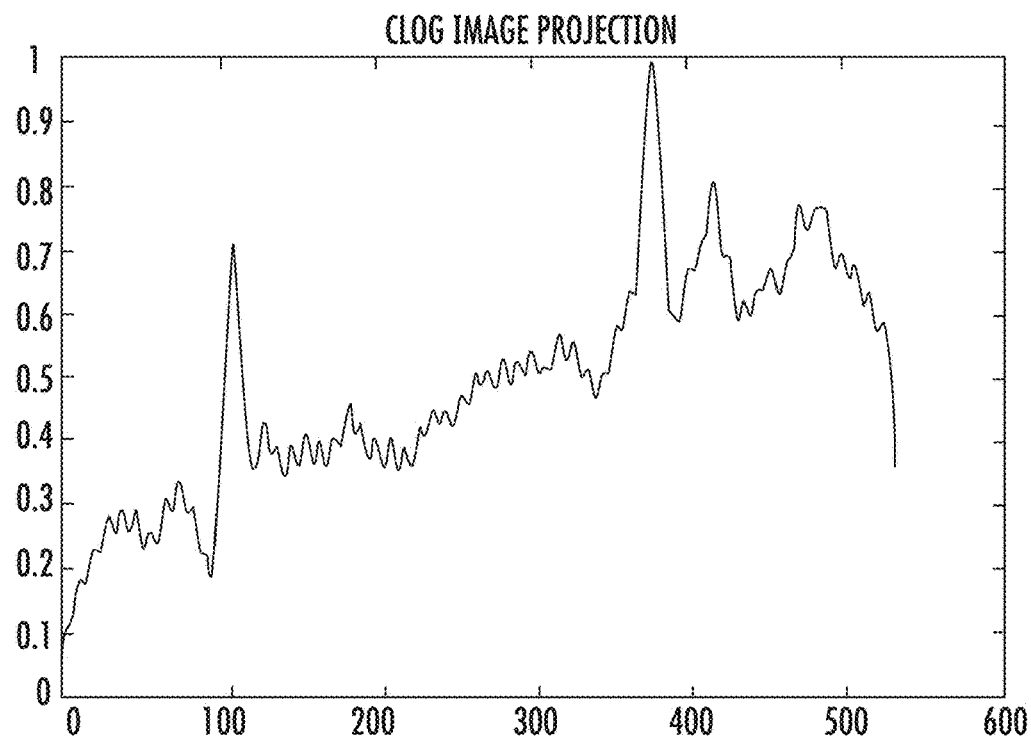
FIG. 11 shows a simple weld.
Figure 12:
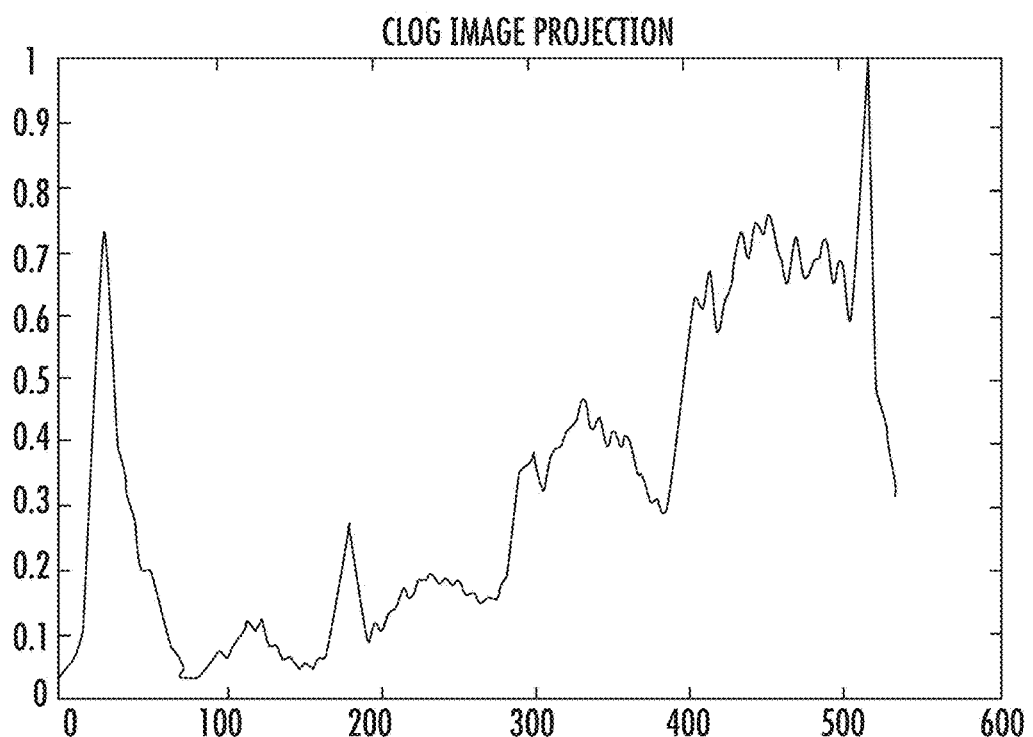
FIG. 12 shows a complex weld.

Laplacian of Gaussian (LOG) polarity filters are used to enhance the high special frequency components of cracks and a time-shift average (TSA) filter registers images and averages them to get a high signal-to-noise ratio. The TSA is used to remove camera motion in an X and Y plane by averaging multiple frames, for example 15 frames. This step removes translations in the X and Y plane as well as random motion which has issues in scale, skew, rotation, and translation. A second TSA is used to build and register a 2D mosaic of the full scan, FIG. 7, using multiple frames, for example filtered frame 1, FIG. 8, filtered frame 15, FIG. 9, and filtered frame 30, FIG. 10 of a 30-frame filtered stack which is generated by stitching the corrected images together. Weld boundary extraction from the image is also used by projecting columns of the crack LOG filtered image (FIG. 7-2D mosaic) and then using a peak finding algorithm in the projection traces to get simple, FIG. 11, and complex weld boundaries, FIG. 12. A 2D Gaussian filter is applied to smooth the image and de-fragment any cracks captured in the image.

Figure 13:
FIG. 13 shows a raw image with gamma radiation.
Figure 14:
FIG. 14 shows the raw image of FIG. 13 filtered to remove gamma radiation spikes.

In the case where gamma radiation noise is present, FIG. 13, a three-stage filter is used. The initial filter is a DeSpike filter to remove impulse noise. It is an adaptive 3×3 or 5×5 median filter that replaces spike noise with the median value in the 3×3 or 5×5 neighborhood. The term adaptive means to not replace a pixel if the neighborhood is smooth and without impulse noise. The second stage is an anisotropic filter called a Bilateral filter which further reduces both residual soft spike noise and background Gaussian noise and is also edge preserving. The final filter takes a small window of successive filtered frames and averages to provide a final filtered frame, FIG. 14. Small spike noise that remains is random between frames—this filter averages 3 to 7 frames and reduces residual spike noise and enhances weak image features.

Shape and Segmentation

Figure 7:
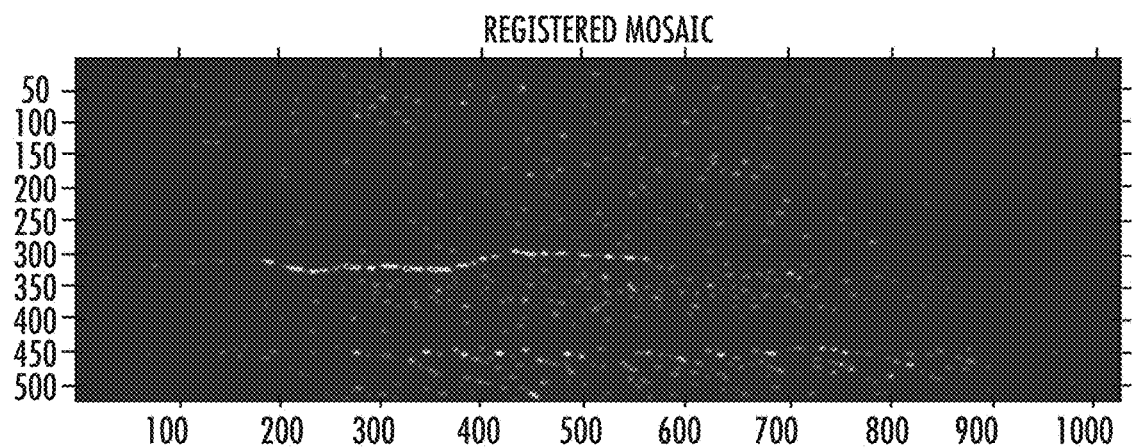
FIG. 7 is a registered mosaic.
Figure 15:
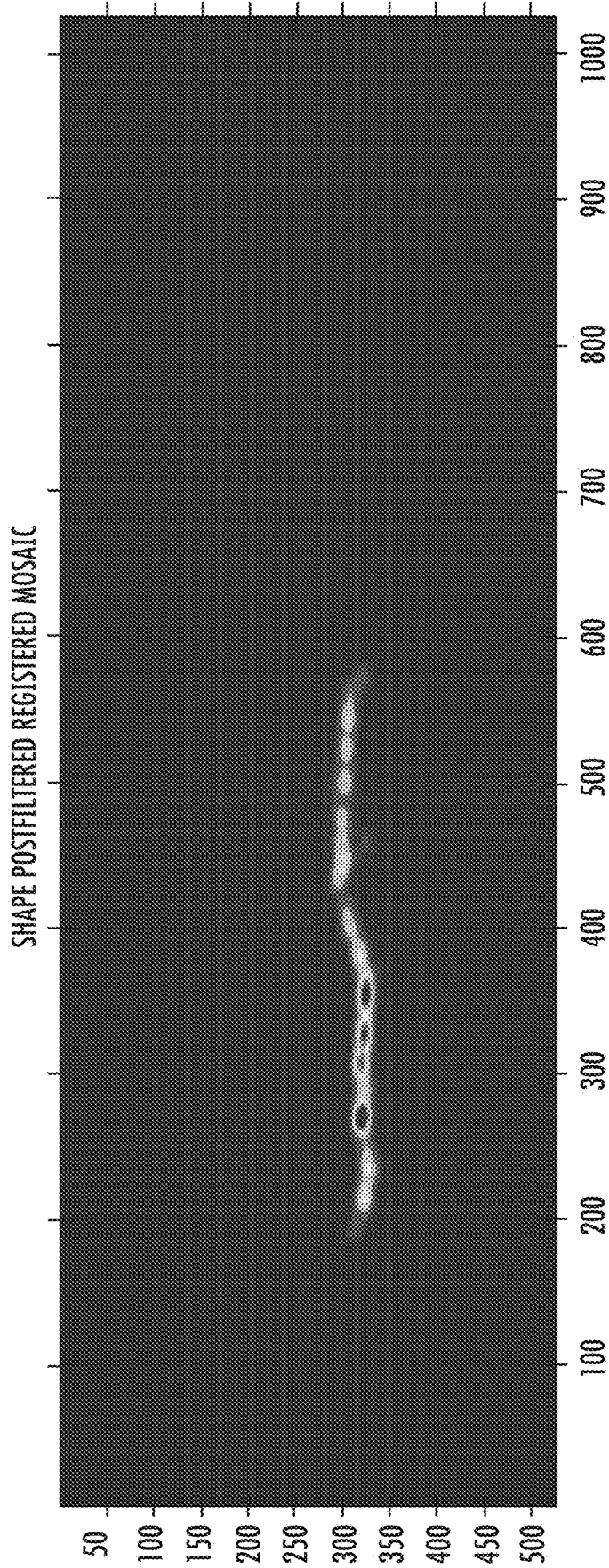
FIG. 15 shows a shape filtered mosaic.

With the crack LOG image, FIG. 7, reduced to a 2D filtered mosaic image, the mosaic image becomes the source for an automated analysis. The crack LOG image is an edge enhanced image and the edge pixels form blobs, FIG. 15, when using a connected component analysis. Step 1 is an automated construction of a binary image using the threshold that is determined from the mean value and standard deviation of the CLOG image. Step 2 takes the binary image (pixel value of 1 is above threshold and 0 is below) and finds regions that are connected in a 3×3 neighborhood. From the connected regions the following properties are extracted: (1) area of the blob is used to remove small amorphic regions when used along with length-width ratio; (2) length-width ratio calculates the major and minor axes of the blob and determines if it is an elongated region like a crack or round region like a large bubble; (3) angle of the elongated region is used to find the angle of the major axis and can be used to find such features as parallel or perpendicular to the weld; (3) mean raw pixel amplitude—the shape blob is used as a mask to address the raw pixels underneath and get the mean amplitude and other statistics of the region—these are histogram features that are used in a crack classifier to classify fragments as a crack signal.

The weld boundary is key for crack confirmation as cracks have high probability of being in the weld and having a preferred angle orientation relative to the weld. Weld boundary is determined by projection of the vertical lines and peak finding to locate the weld boundaries. See FIGS. 16 and 17.

Classification for Cracks and Welds

Figure 18:
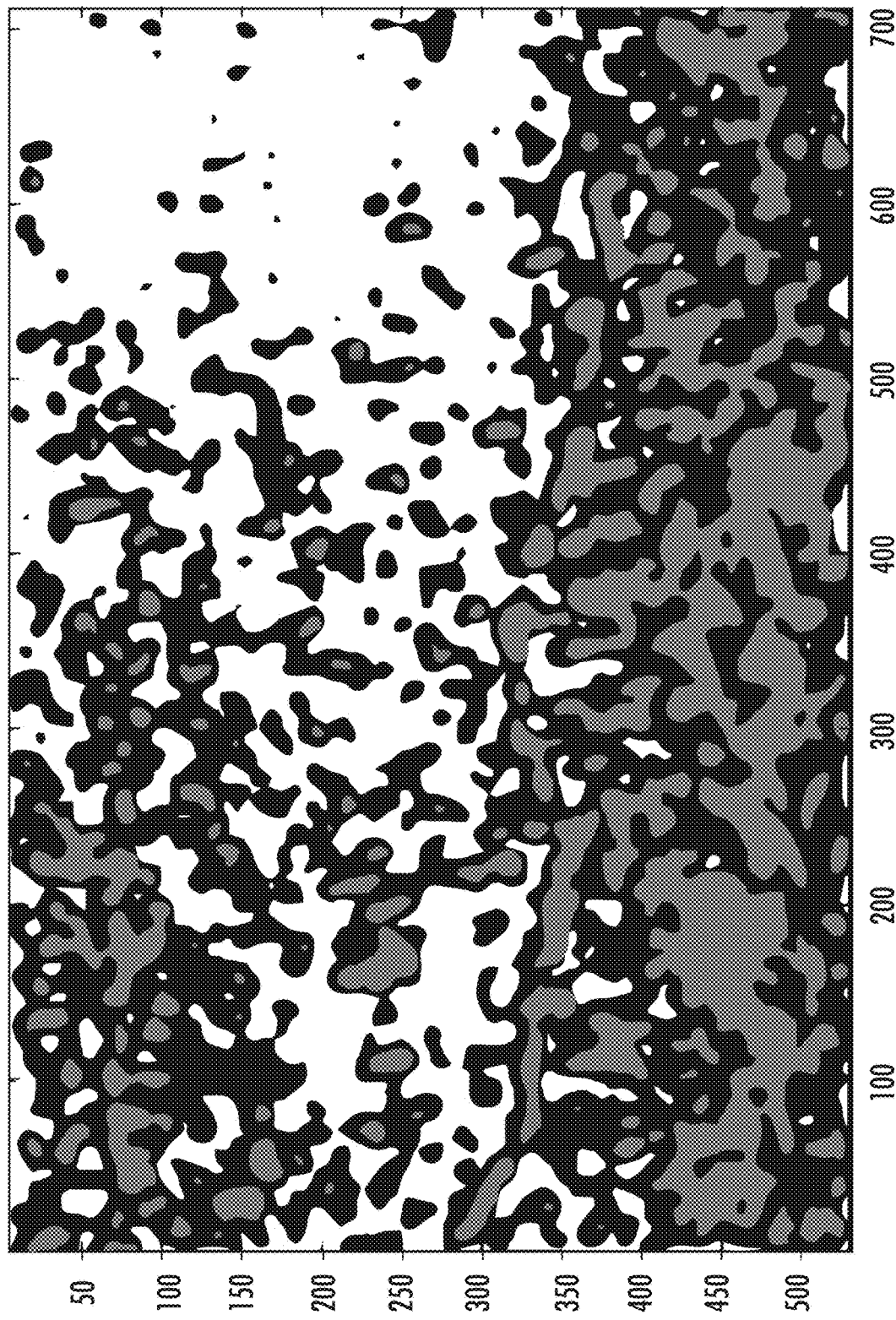
FIG. 18 shows Gabor cluster segmentation.

Filtering and shape-based segmentation do a good job of pulling out cracks and grinding regions from noise; however, segmented cracks and deep isolated grind regions need to be separated. A texture-based approach, FIG. 18, allows a user to find features to discriminate short segments of crack and grind.

Texture is spatial frequency information. It is measured in a window around a pixel. It differs from simple pixel variance in the same window as it is dealing with structured amplitude variation. For example, a sine wave and a random sine wave (where the sine wave has been randomly sampled) have the same variance but differing texture.

A Gabor filter approach was developed to generate pixel level texture features in a small 21×21 overlapping image patch. The Gabor filter is a windowed Fourier transform with real and imaginary parts that is generated over a large range of spatial frequency, angle, and bandwidth to create texture features. The Gabor filter creates a stack of filtered images and texture feature vectors which can be constructed from the pixel location across the filtered image stack. Each pixel in the center of the patch is characterized by the Gabor vector over these parameters.

A special version of the Gabor filtered image stack has been developed to remove angle specific information. Cracks and grind can be of any orientation and since it is a narrow edge response the angle peak energy will be narrow. Using a high dimension Gabor feature vector generated from the Gabor modulus of the complex vector, the pixels are clustered into three groups of low, medium, and high texture energy. Later new pixels are labeled in the three texture regions using the Euclidean distance to the clusters. These labeled pixels are then processed with a 2D connected components and the shape of the blobs are extracted. Large amorphic and non-elongated blobs are classified as being grind regions.

Figure 19:
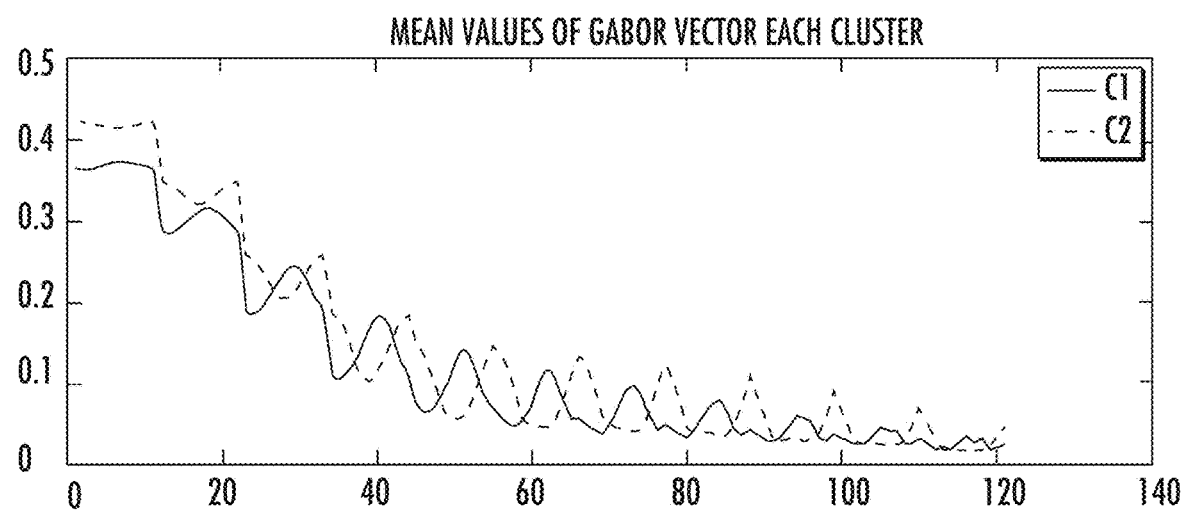
FIG. 19 illustrates mean values of Gabor vector.
Figure 20:
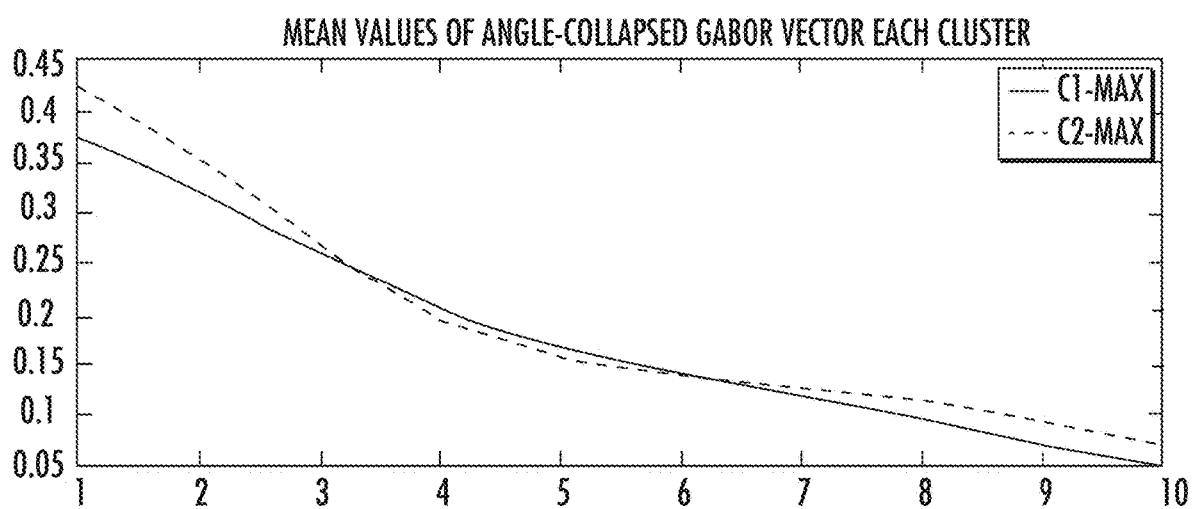
FIG. 20 illustrates mean values of angle-collapsed Gabor vector.

Within a bandwidth and spatial frequency two new features within the Gabor vector are generated:
   Max-angle energy which is the peak energy across the Gabor angles
   Max-angle location which is the angle of the maximum. This can be used to measure the smoothness of energy and angle within the segmented blob An example is shown in FIGS. 19 and 20 where Gabor vectors were generated for grind and crack regions. The mean vector of each region was calculated. Grind was mostly vertical and crack was not vertical and the Gabor vector shows different peak values at the different angles. The max-angle Gabor was generated and this showed different energy profiles over spatial frequency for grind and crack and now specific angle is not a variable in the classification.

FIG. 19 is a raw 120 element Gabor vector with individual angle values for each frequency. FIG. 20 has each angle value replaced by a single value—the maximum angle energy within each frequency bin. In the figure C1 is crack and C2 is the deep grind regions.

In addition to or instead of max-angle Gabor feature vectors which classify crack from non-crack having similar shape characteristics. Gabor wave-angle filtering may be used to isolate small, localized angle shifts in image edges to detect weak reflector signals and perturbations in complex backwall signals that may indicate unseen metal surface issues. Gabor wave-angle filtering is beneficial when using ultrasound going through layers of steel and concrete which cause reflection anomalies.

Gabor wavelet filters have been used for discrimination of cracks and deep grind. The max-angle Gabor feature vector finds the largest energy over all angles at a given frequency and bandwidth. This creates a feature vector that is used to classify segmented sections as crack or grind, both of which can have similar shape.

A second implementation of the Gabor wavelet filter bank is to use wave-angle filtering which is used to select a limited number of angles and average over all frequencies and wavelengths in this limited angle range.

The images that are generated can be combinations of different angle bands. Some bands can be used to extract background geometry in parts. Other bands can be used to extract local deformations that extend in the 3D structure and where the deformations are embedded in non-deformed backgrounds.

Figure 21:
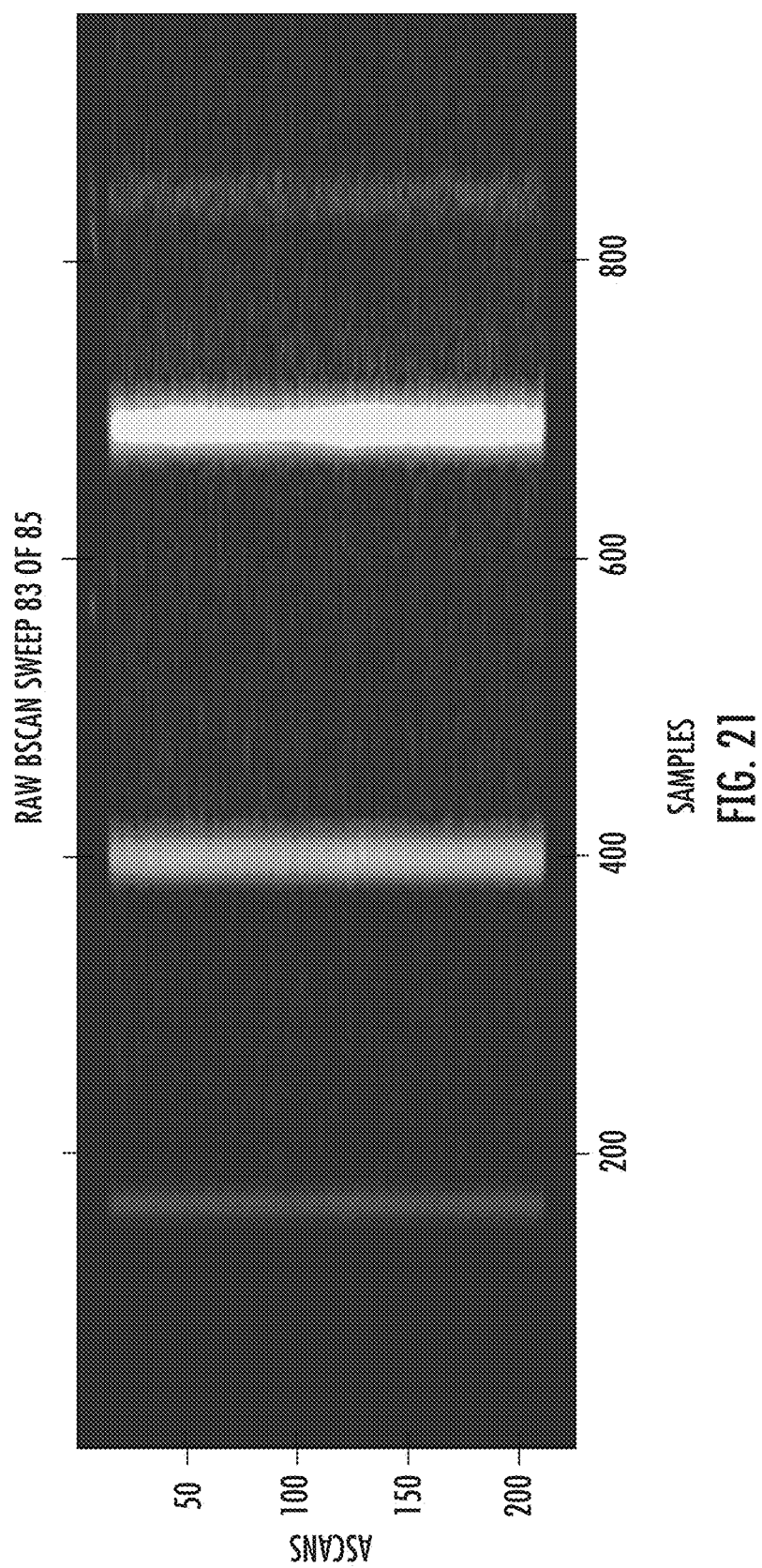
FIG. 21 shows a raw image with backwall interference.
Figure 22:
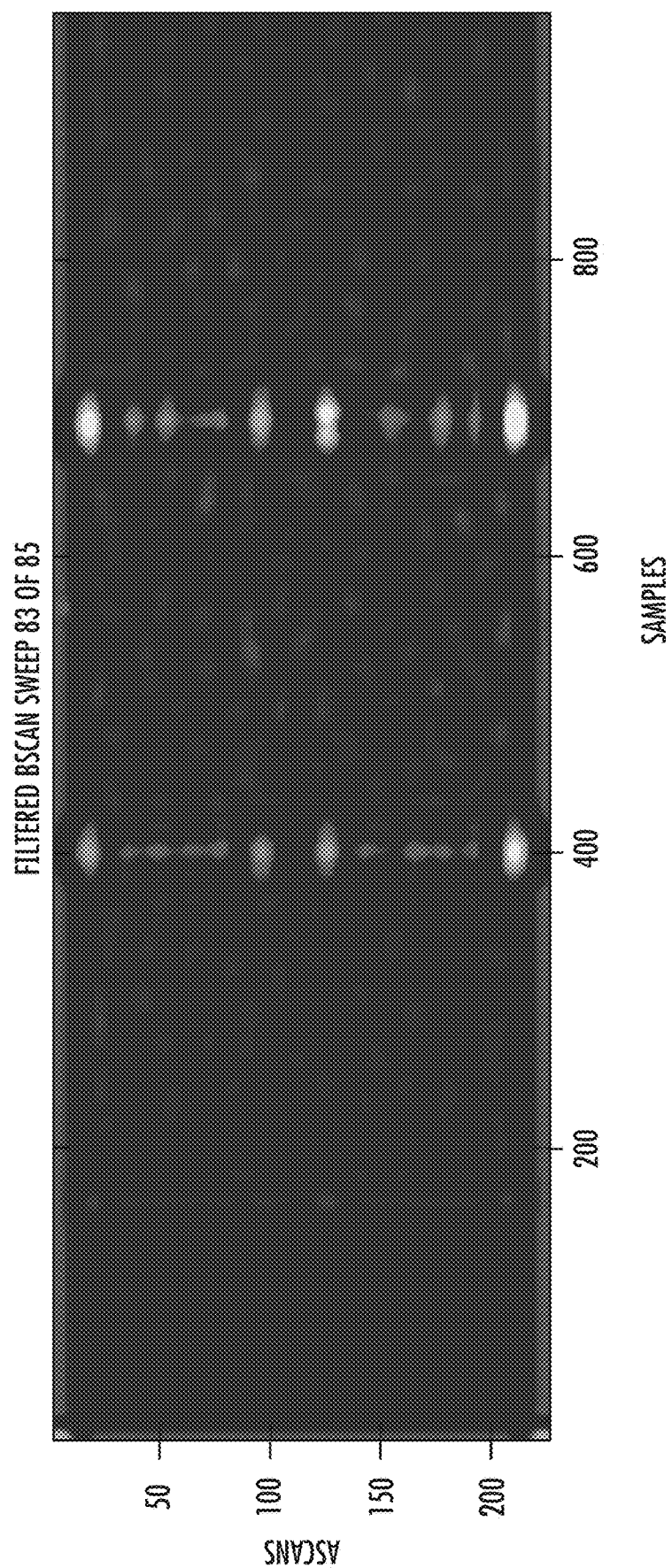
FIG. 22 shows the image of FIG. 21 with the backwall interference removed.

One implementation example where wave angle filtering has been applied is in Time of Flight Ultrasonics (TOF). Wave angle filtering enhances low signal to noise ratio (SNR) signals which are both crack diffraction tips and backwall interference signals. As shown in FIG. 21, the raw image shows small kinks on a backwall due to metal interference from a metal-on-metal bond. This interference has caused a slight reflection anomaly that the Gabor wave angle filter has extracted, FIG. 22. In other words, the backwall has been removed and the kinks and/or discontinuities are extracted by enhancing and isolating the kink pattern. This can be seen further in FIGS. 23 and 24.

Figure 25:
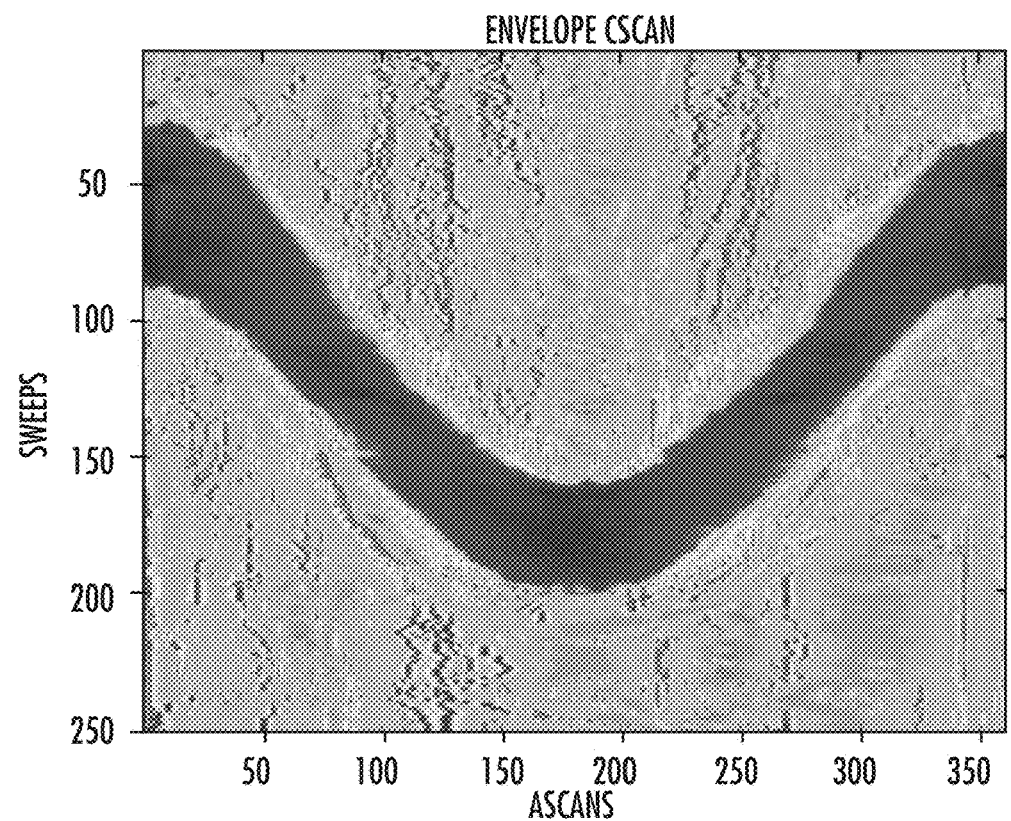
FIG. 25 shows a Cscan of FIG. 23.
Figure 26:
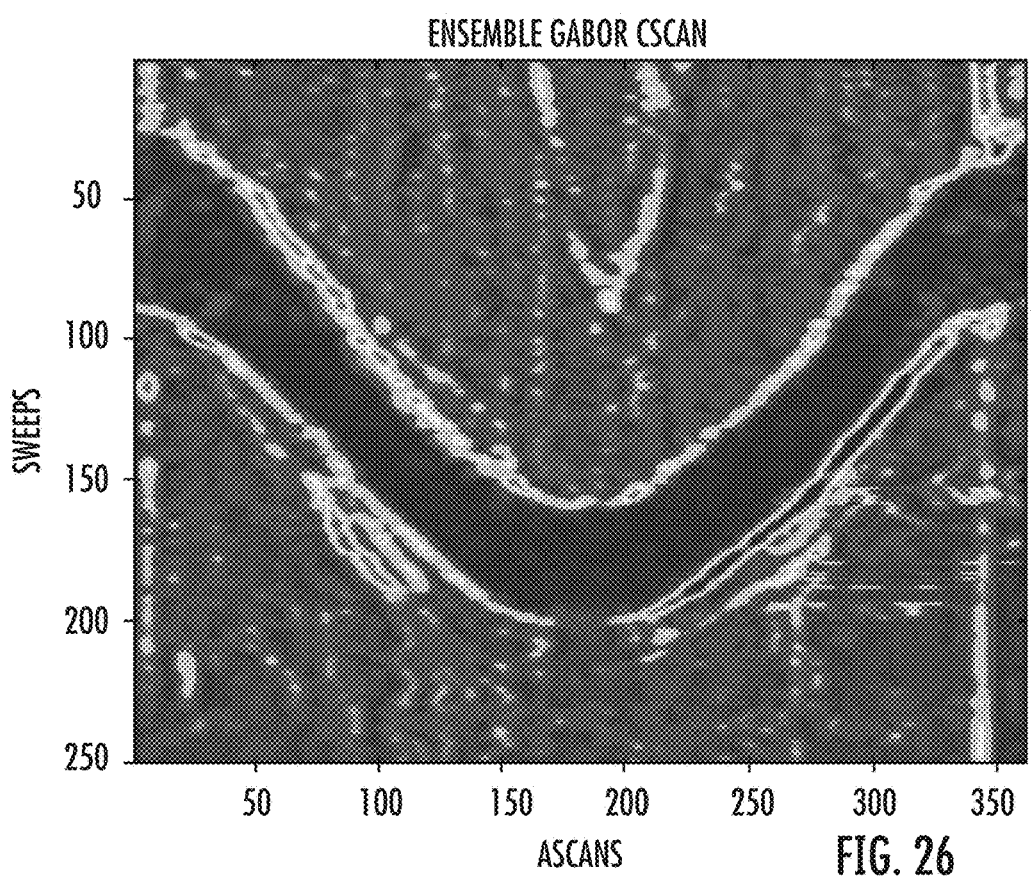
FIG. 26 shows a Cscan of FIG. 24.

In another example, FIGS. 25 and 26, of an in-service metal surface we see a similar anomaly in the backwall signal. To show the relevance of the signal we build a Cscan Image from a rotation of the 3D slab of Bscans for both the raw and Gabor filtered image. What can be seen is that the filtered Cscan is showing a structured V-shaped region where the backwall kink signal was and this is not seen in the original data Cscan because the amplitude of the raw signal at the kink is in the same range as the entire backwall signal.

Figure 27:
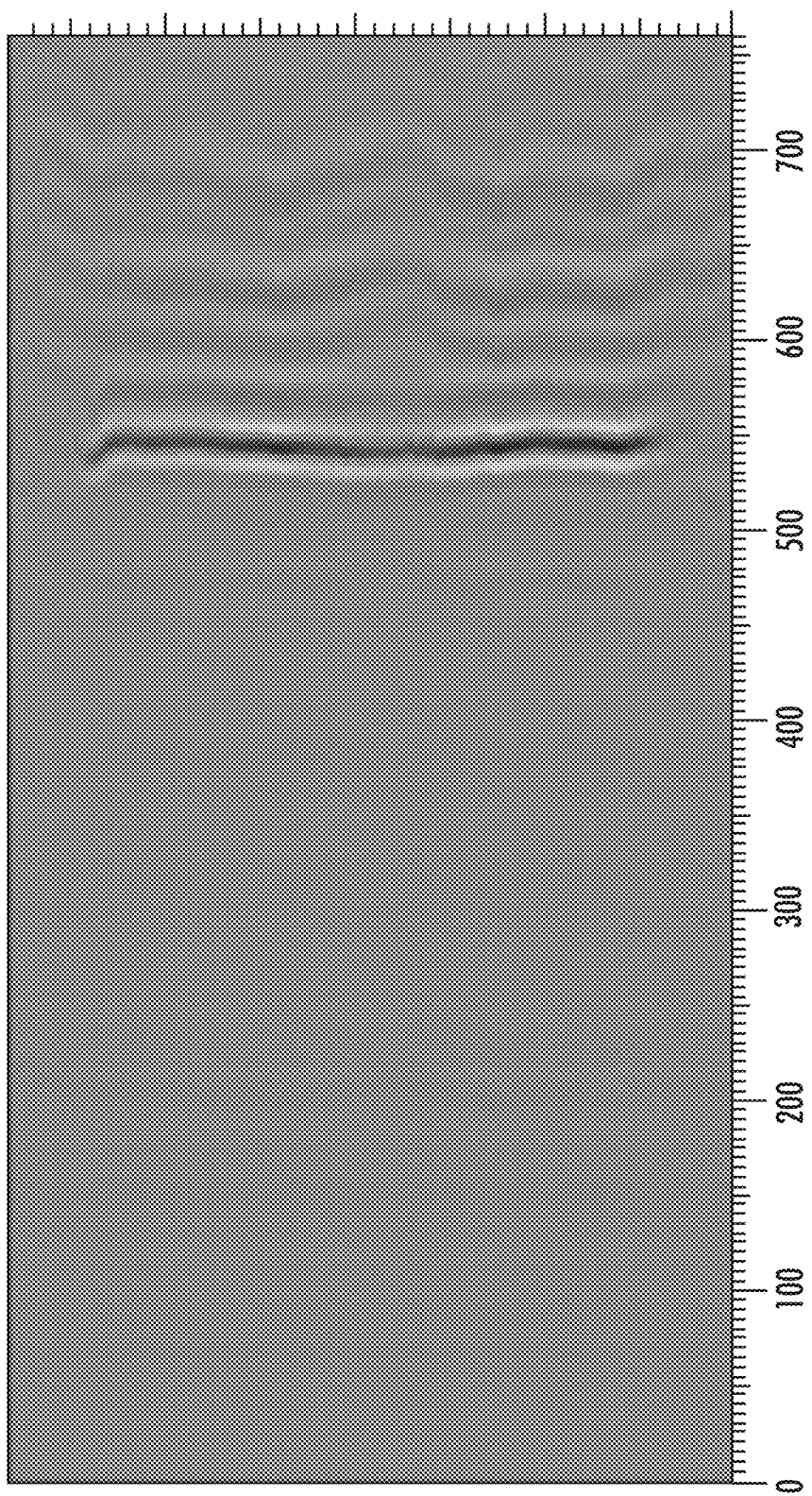
FIG. 27 shows a raw image with a low signal to noise ratio diffraction tip.
Figure 28:
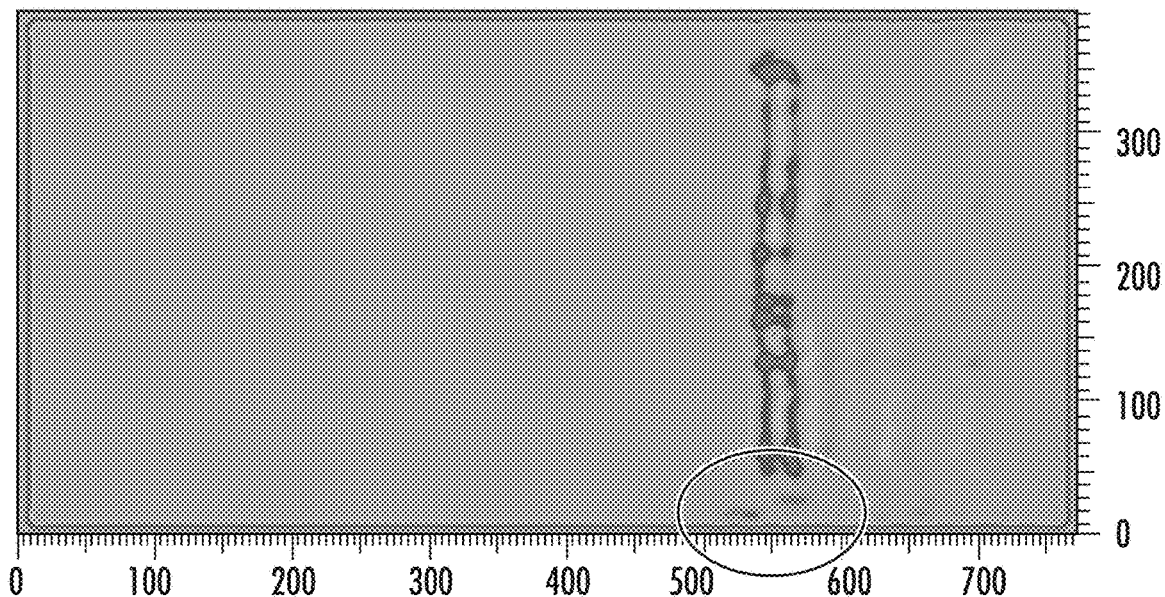
FIG. 28 shows extraction of a crack signal using wave angle filtering.
Figure 29:
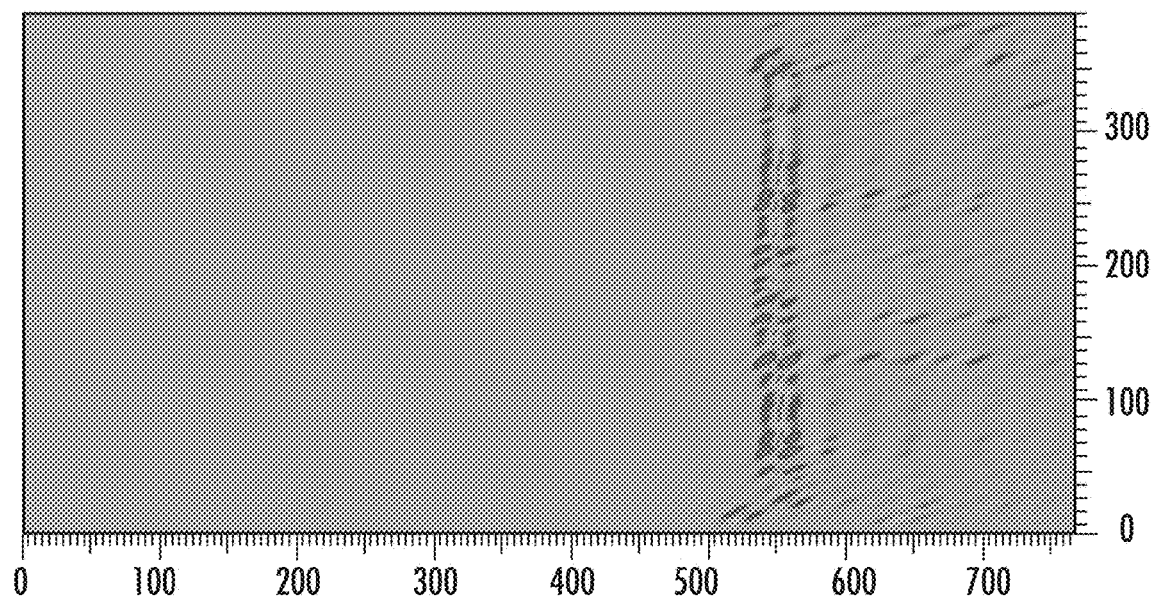
FIG. 29 shows a single angle and single spatial frequency.

Additional application is to extract a very low SNR diffraction tip signal. The diffraction tip is shown as very weak and not observable in the original image, FIG. 27. The Gabor wave-angle filtering has extracted the pattern making the detection by human and/or machine algorithm much easier, FIGS. 28 and 29.

Machine Learning Classifiers for Max-Angle Gabor

Two classifiers (unsupervised and supervised) were developed for the max-Angle Gabor feature vector to demonstrate a dual classifier for crack classification and a classifier for grind regions and narrow crack-like grind segments.

Figure 30:
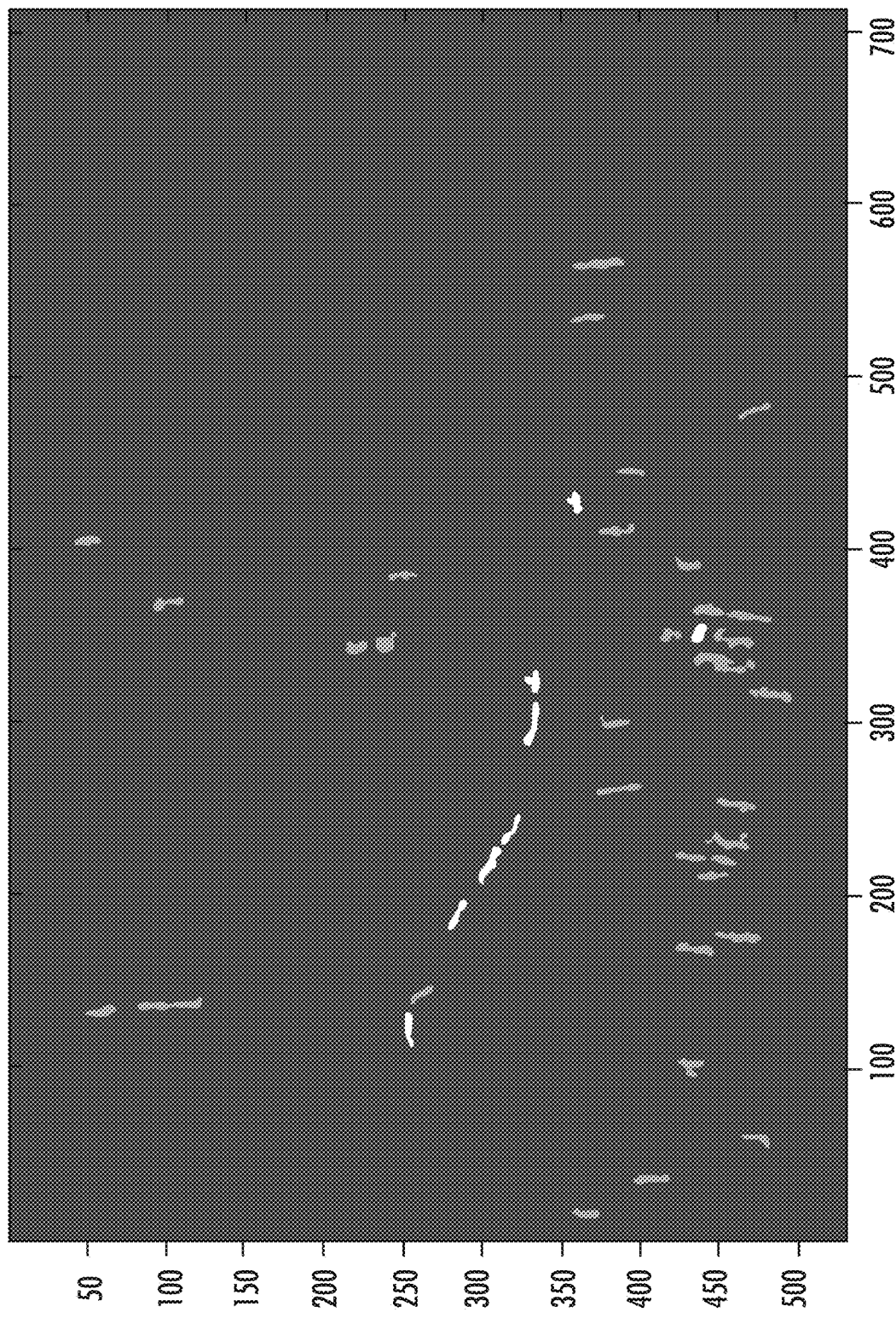
FIG. 30 shows shape crack and grind blobs.

The unsupervised method is a clustering and uses two-stage method of initial k-means followed by a Gaussian Mixture Model (GMM). Given cluster centers each pixel level Gabor vector is classified into one of three classes that were trained. Both grind and crack fall into the same class. Using shape metrics (previous connected component and blob shape) the grind regions can be extracted based on the blob shape and size and is a classification of grind region, FIG. 30.

The supervised method is also based on Gabor. Crack and grind segments can have a different angle and the traditional Gabor texture uses an angle parameter. This can be a limitation of the measure if new orientations are present. The supervised method uses "max-angle Gabor" where a normal Gabor feature vector is present but for each frequency-bandwidth a sweep over all the angles is performed and the maximum energy in the range of angles is used. Using that feature vector, a classification accuracy of over 90% was achieved on crack-grind segment classification.

To accomplish the supervised method, a Random Forest classifier was trained on just the cracks and deep crack-like grinds. The Random Forest (RF) is an ensemble Decision Tree (DT) method and is constructed from a large number of DT units that are suboptimal. They are sub-optimal because each one is constructed from a random subset of the features. This makes them robust to new data and the ensemble means the trees each vote so a probability of each class can be evaluated. The results for the crack-grind show <10% error as number of trees approach 300.

Multi-Classifier Layer

The final step is using multiple classifiers for crack-grind. The RF is an ensemble method and the final classifier will be a combination of RF as well as MultiLayer Perceptron (MLP) and Support Vector Machine (SVM). The MLP will be run also in a probabilistic mode which is achieved by using a 'Softmax' neural output layer. The SVM is a binary output and that will be converted to a distance from the decision hyperplane and that can be quantified to a probability. All three of the classifiers will have common response and hard feature vectors will not be unanimous and the voting can deal with these vectors (along with the probability of each classifier).

The Gabor texture is the result of feature engineering. Features are points in a vector space and the classifier builds boundaries from these. There can be an overlap in some vectors that is difficult for the classifier. Feature ranking and selection will be of value as well as feature transformation using standard methods such as PCA (Principal Component Analysis) and PLS (Partial Least Squares). PCA and PLS can be combine with 'kernel methods' to transform to a higher dimension prior to the PCA/PLS. A convolutional neural network (CNN) is used to learn feature extraction. Combining the max-angle Gabor and CNN provides an ensemble classifier that is more robust.

The foregoing has described an apparatus and method for identifying cracks in a structure using a multi-stage classifier. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying claims, abstract and drawings), or to any novel one, or any novel combination, of the steps of any method or process so disclosed.

What is claimed is:

1. A method of inspecting a structure for cracks, comprising the steps of:
    moving an inspection vehicle along a pre-determined path through an area to be inspected, the inspection vehicle having a camera apparatus configured to scan the area to be inspected;
    using the camera apparatus to scan the area to be inspected at a pre-determined distance per second, thereby capturing scan data for analysis; and
    analyzing the scan data to classify cracks in the structure, the step of analyzing including the steps of:
        filtering the scan data to generate crack and scratch image frames;
        registering the crack and scratch image frames to generate a single mosaic image; and
        performing shape and segmentation processing to remove small high amplitude disc noise, smooth fragmented cracks, and extract elongated targets that are crack like.

2. The method according to claim 1, wherein the inspection vehicle is autonomous.

3. The method according to claim 1, wherein the inspection vehicle is remote controlled.

4. The method according to claim 1, wherein the step of filtering includes applying a three-stage filter to the scan image to remove non-uniform illumination, separate the scan image into high amplitude scratch and low amplitude crack + grind frames, and enhance high special frequency components of cracks.

5. The method according to claim 1, further including the step of generating texture and spatial frequency data for cracks.

6. The method according to claim 5, wherein the step of generating texture and spatial frequency data includes the step of using a Gabor filter approach to generate max-angle energy across Gabor angles and max-angle location.

7. The method according to claim 5, further including the step of implementing machine learning classifiers and a multi-classifier layer.

8. The method according to claim 1, further including the step of using wave-angle filtering to isolate small, localized angle shifts in the scan data.

9. The method according to claim 1, wherein the predetermined distance per second is 2.54 cm per second.

10. A method of inspecting a nuclear reactor vessel, comprising the steps of:
providing a rail system disposed in the nuclear reactor vessel, the rail system being designed to provide a pre-determined inspection path through the nuclear reactor vessel;
providing an inspection vehicle configured to traverse the rail system, the inspection vehicle having a camera apparatus configured to scan the nuclear reactor vessel along the inspection path;
using the camera apparatus to scan along the inspection path at a pre-determined distance per second, thereby capturing image data of the nuclear reactor vessel; and
analyzing the image data to classify cracks in the nuclear reactor vessel, the step of analyzing including the steps of:
filtering the image data to generate crack and scratch image frames;
registering the crack and scratch image frames to generate a single mosaic image; and
performing shape and segmentation processing to remove small high amplitude disc noise, smooth fragmented cracks, and extract elongated targets that are crack like.

11. The method according to claim 10, wherein the step of filtering includes applying a three-stage filter to the scan image to remove non-uniform illumination, separate the scan image into high amplitude scratch and low amplitude crack + grind frames, and enhance high special frequency components of cracks.

12. The method according to claim 10, further including the step of generating texture and spatial frequency data for cracks.

13. The method according to claim 12, wherein the step of generating texture and spatial frequency data includes the step of using a Gabor filter approach to generate max-angle energy across Gabor angles and max-angle location.

14. The method according to claim 12, further including the step of implementing machine learning classifiers and a multi-classifier layer.

15. The method according to claim 12, further including the step of using the camera apparatus to transmit analyzed image data to a human analyst for final analysis.

16. The method according to claim 10, further including the step of using wave-angle filtering to isolate small, localized angle shifts in the scan data.

* * * * *